(12) United States Patent
Montgomery

(10) Patent No.: US 8,363,210 B2
(45) Date of Patent: Jan. 29, 2013

(54) THREE DIMENSIONAL FEATURE LOCATION FROM AN EXCAVATOR

(75) Inventor: James Leonard Montgomery, Dubuque, IA (US)

(73) Assignee: Deere & Company, Moline, IL (US)

( * ) Notice: Subject to any disclaimer, the term of this patent is extended or adjusted under 35 U.S.C. 154(b) by 306 days.

(21) Appl. No.: 11/925,075

(22) Filed: Oct. 26, 2007

(65) Prior Publication Data
US 2009/0112472 A1 Apr. 30, 2009

(51) Int. Cl.
*G01C 3/00* (2006.01)

(52) U.S. Cl. .......... 356/3; 356/3.03; 356/4.01; 701/223; 701/219; 701/301; 324/326; 324/67; 324/22; 340/903; 340/905; 702/193

(58) Field of Classification Search ............... 356/3.03, 356/3, 4.01, 5.06, 614; 367/14; 172/1; 700/245
See application file for complete search history.

(56) References Cited

U.S. PATENT DOCUMENTS

| | | | |
|---|---|---|---|
| 4,685,054 A * | 8/1987 | Manninen et al. ............... 700/86 |
| 4,805,086 A | 2/1989 | Nielsen et al. |
| 4,829,418 A | 5/1989 | Nielsen et al. |
| 4,866,641 A | 9/1989 | Nielsen et al. |
| 4,884,939 A | 12/1989 | Nielsen et al. |
| 4,945,221 A | 7/1990 | Nielsen et al. |
| 4,949,089 A * | 8/1990 | Ruszkowski, Jr. ............... 342/52 |
| 5,572,809 A | 11/1996 | Steenwyk et al. |
| 5,742,069 A | 4/1998 | Steenwyk et al. |
| 5,848,485 A * | 12/1998 | Anderson et al. ............... 37/348 |
| 5,907,111 A * | 5/1999 | Josten et al. .................. 73/866.5 |
| 5,953,838 A | 9/1999 | Steenwyk et al. |
| 6,085,583 A * | 7/2000 | Cannon et al. .................. 73/149 |
| 6,480,289 B1 * | 11/2002 | Shimomura et al. .......... 356/614 |
| 6,736,216 B2 * | 5/2004 | Savard et al. ..................... 172/1 |
| 6,826,452 B1 * | 11/2004 | Holland et al. ............... 700/245 |
| 7,139,662 B2 * | 11/2006 | Ericsson et al. ............. 701/207 |
| 7,144,191 B2 * | 12/2006 | Kieranen et al. ............. 404/84.1 |
| 2004/0190374 A1 * | 9/2004 | Alft et al. ........................ 367/14 |
| 2005/0173153 A1 * | 8/2005 | Alft et al. ........................ 175/46 |

OTHER PUBLICATIONS

Thayn, Brett, "Autonomous Solutions Inc. Backhoe Documentation," 5 pages, Jan. 17, 2002.
"Software Compatibility List," Laser Technology, Inc., Centennial, CO, 1 page, date unknown.
"Rectilinear Displacement Transducer for Mounting Inside Hydraulic Actuators" Gefran spa, D'Iseo Italia. 2 pages, Mar. 2006.
"About GPS Laser Ofsets," Laser Technology, Inc., Centennial, CO, 4 pages, dated 2004.
"Displacement Transducers," Gefran spa, D'Iseo Italia. 20 pages, Nov. 2006.
"Forest Pro Laser," Laser Technology, Inc., Centennial, CO, 1 page, date unknown.
"TruPulse 200," Laser Technology, Inc., Centennial, CO, 1 page, date Apr. 9, 2007.
"TruVector 360," Laser Technology, Inc., Centennial, CO, 1 page, date Apr. 9, 2007.

(Continued)

*Primary Examiner* — Tarifur Chowdhury
*Assistant Examiner* — Isiaka Akanbi
(74) *Attorney, Agent, or Firm* — Faegre Baker Daniels LLP

(57) ABSTRACT

A combination of location measurement apparatuses to measure in three dimensions the location of an excavator with respect to a job site, and to further measure the location of an excavated or a topographical feature with respect to the excavator by range finding from the excavator in proximity of the feature and contemporaneously recording measurement data on a computer.

36 Claims, 3 Drawing Sheets

OTHER PUBLICATIONS

Michelsen Jr., Michael W., "Construction in the Space Age," Grading & Excavation Contractor, 11 pages, Mar. 2000.

"Laser Range-Finder," Answers.com, 4 pages, Apr. 9, 2007.

"Laser Range-Finder," Wikipedia, 3 pages, Apr. 9, 2007 available at "http://en.wikipedia.org/wiki/Laser_range-finder".

* cited by examiner

THREE DIMENSIONAL FEATURE LOCATION FROM AN EXCAVATOR

SUMMARY OF THE INVENTION

The instant invention relates to an earth excavating machine having a means of locating a position on the earth and/or beneath the surface of the earth and recording the same.

BACKGROUND OF THE INVENTION

Excavation machines of various descriptions find application in the installation, removal, and repair of below and above ground utilities and structures. Typical below ground utilities include water mains, sewers, conduit for electrical and communications lines; electrical and communications lines installed without conduit, subway transit tunnels, water tunnels and the like.

Below ground installation of utilities such as electrical and communication lines removes the utility lines from the visual appearance of the landscape. The location of underground utilities is generally established in advance by design engineers and provided to persons installing the utilities in the form of drawings. Location includes not only the X-Y-axes location of the utility with respect to the surface of the earth, but also includes location on the Z-axis, e.g., the distance beneath the surface of the earth or possibly referenced to sea level. In practice, the actual location of underground utilities may deviate from the location described in preconstruction drawings because of interference below the surface of the earth resulting from rocks, or rock formation, trees, building foundations or previously installed utilities unknown to the design engineers. In anticipation of the installation of additional below ground utilities and structures in the vicinity of a first structure, and in anticipation of possible repair or replacement of a first underground utility in a vicinity, and to prevent subsequent excavations from encountering unmarked sub-surface utility structures or sub-surface obstructions, engineers make a record of the location of the utility, as installed and possibly other sub-surface obstructions. Such locations are recorded on drawings known as "as-built drawings".

Initial or crude as-built drawings edited in the field may be red-line notations on a copy of the design drawings, or in a preferable circumstance, the location of the as-built utility may be established by hand measurements and surveying instruments. Notes of such measurements, if they are preserved and located, may be subsequently transferred to as-built drawings now more often in electronic form by means of computer aided design tools such as the program AutoCad™ or similar computer aided design tools.

The instant invention finds utility with excavation machines including tracked excavators, wheel-based excavators, and tractor-based backhoes. It is known to determine the location of an excavator, or other machine for adjusting and moving surface and below surface earth by means of global positioning devices (GPS). The GPS device determines the location of its antenna. If the antenna is located on the machine, then the machine location may be determined with relation to satellite triangulation. The location of a feature on a job site requires location of the GPS antenna at that location. While the location of sub-surface "as-built" features on a job site may be found by locating GPS antennas at such features, such a task has limited advantages over hand measurements and surveying instruments. Notes of measurements and transfer of the as-built measurements to drawings remains a requirement. Typically, the as-built drawings will be a condition precedent to final payment to a builder or contractor by a utility company or municipality. Furthermore, GPS signals may be obstructed within an a below ground level excavation, or by neighboring building structures or terrain.

"Offsets" provide a useful addition to GPS location information. An offset is the distance, direction, orientation, and depth (or height) of a feature determined with respect to the location of the GPS antenna. When the offset is combined with GPS location, the location of the feature can be identified in three coordinates. Identification of two points on a target feature discloses the orientation of the feature as well as the location of the feature.

DESCRIPTION OF EMBODIMENTS OF THE INVENTION

The present invention concerns a combination of an identified feature and an offset to an excavation machine.

A further embodiment of the invention concerns a further offset from the construction machine to a feature established by a laser range finder affixed to the excavator "dipper".

A further embodiment of the invention concerns real time integration of the location of the feature into the data for preparation of as-built drawings.

A further embodiment of the invention concerns collection of data characteristic of topographic features.

A further embodiment of the invention concerns transmitting data characteristic of topographic features to a computer apart from the excavator.

A further embodiment of the invention concerns manipulation of data to characterize topographic and installation features in real time by an on board computer.

Early commercially available GPS provided limited accuracy of the measured location. The signals originally intended for military application were degraded when applied to civilian uses. Accuracy of early GPS was on the order of 100 meters. "Differential GPS" involved a reference station positioned at a known location, possibly several miles from the area of interest (such as an excavation work site), which calculated corrected data that was re-broadcast to local receivers. Differential GPS provided accuracy on the order of a fraction of a meter to several meters. Subsequent developments including 'real-time kinematic processing' also involving a reference station enabled civilian users to achieve centimeter-level accuracy of a stationary or moving GPS receiver. GPS systems affording centimeter-level accuracy are available from Trimble Navigation Limited, Sunnyvale Calif., United States.

Figure 5:
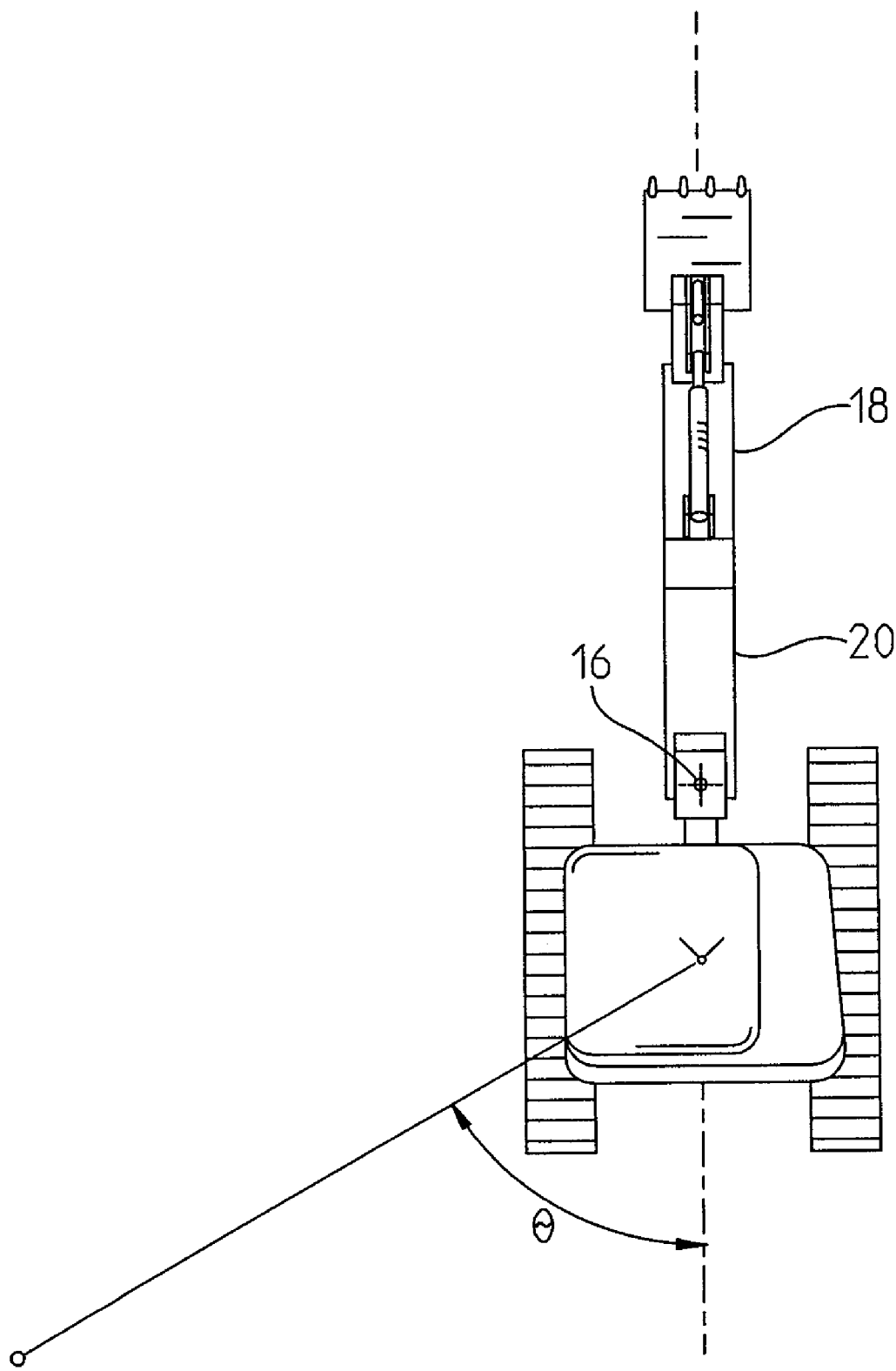
FIG. 5 illustrates an angle reference set-off from a reference location.

Alternatives to GPS reference stations include Local Positioning Stations which, like Differential GPS and real-time kinematic processing require a reference station positioned at a known location. Data from the reference station may be transmitted to the job-site excavator by laser or radio frequency communication rather than as satellite signals. As illustrated by FIG. 5, a signal from a Local Positioning Station locates the antenna 14 of the excavator, its location point. The angle θ in FIG. 5, of the excavator arm locates and provides data for the vector direction of the setoff from the location point to the laser rangefinder, and from the range finder equipped excavator arm. A typical job-site positioning by laser reference station is provided by Topcon Laser Systems Inc., Pleasanton, Calif., United States. Accuracy is promoted as a few millimeters.

For some applications of the invention determination of the location of the excavated feature on the job site is sufficient. The location of the feature on the earth is not warranted, or required. In such instances, the GPS location may be omitted, and the excavated feature may be located with respect to the job-site reference station or a benchmark surveyed independently of activity related to the excavation work site.

The foregoing systems accurately locate the excavator (or properly more accurately stated, the location of the receiving antenna on an excavator, its location point). What has heretofore not been provided is a means of locating features such as structures and interfering utilities below grade, as well as above grade features from the operator position of the excavator.

There is here disclosed and claimed an excavator having a laser-type range finder 10 mounted on an excavator 12, the laser-type rangefinder having a known setoff from an excavator location point 14. Laser-type rangefinders that may be useful for enabling the instant invention include products of Laser Technology, Inc., Centennial, Colo. 80112, and Schmitt Measurement Systems, Inc. Portland Oreg. 97210, both of the United States.

In use, the location of a feature is determined by a combination of measurements and set-offs determined from the location point on the excavator. From the known location of a reference station a first offset to the excavator, job-site positioning, is determined. The first offset is variable and depends on the location of the excavator on the job site. A second offset is the fixed relation between the location point on the excavator and the excavator swing-pin 16. A third set-off is established between the laser rangefinder 10 and the swing-pin 16.

To establish the third set-off from the swing-pin 16 to the laser rangefinder 10 the several axes of rotation and optionally a linear extension in the form of the variable extension on the excavator arm, the 'dipper', are encountered. The first axis of rotation is the entire excavator arm itself by rotating the table of an excavator about a swing-pin 16, or in the case of a tractor mounted back-hoe, rotating the arm on a backhoe equipped tractor about a swing-pin 16. In the case of an excavator operable with a rotating table, it may not be equipped with an actual 'swing-pin', nonetheless, for purposes of the description herein, such table type excavators will be discussed as if a swing-pin were present.

The angular orientation as illustrated by the angle θ on FIG. 5 is between the excavator arm and the Local Positioning Station. For rotating table-type excavators, data to determine the angle excavator arm may be provided as a part of the signal from the local positioning equipment, or determined by the receiver on the excavator. For excavators equipped with an actual swing pin, a rotary encoder at the swing pin provides data to the on board computer to determine the direction angle θ of the excavator arm. As for rotary table-type excavators the angle and distance of the Local Positioning Station from the excavator may be provided as part of the signal from the Local Positioning Station and translated by the on board equipment for input to the on board computer, or generated by the on board computer from the Local Positioning Station.

A second axis 22 relates to the first excavator arm segment commonly referenced as the 'boom' axis 20. A third axis relates to the second excavator arm segment 23 commonly referenced as the 'dipper' or 'crowd' axis 24. The radial orientation of each axis may be measured by a rotary encoder. When combined with algorithms appropriate for the individual excavator, the computer can determine the orientation of the dipper arm, and the distance of a laser generator/receiver of the laser rangefinder 10 on the dipper arm with respect to the swing-pin (actual or virtual) 16.

For excavators equipped with a dipper extension (not shown), a linear encoder and appropriate algorithm provide the computer with the additional data required to calculate the position of the laser generator/receiver on excavators so equipped.

The working environment of excavators may include uneven terrain. The body of the excavator may be oriented such that the pitch and roll of the excavator deviates from horizontal and vertical. Pitch and roll measurement may be determined by inclinometers oriented orthogonally and mounted on the excavator cab or elsewhere on the frame of the tractor or excavator which provide data to the computer respective to pitch and roll of the excavator 'swing-pin' which is rigidly connected with the excavator mainframe. In like manner, pitch and roll acting on the tracks of an excavator is translated to the arm 23 of the excavator through a rigid frame and the axial connections 16, 22, and 24.

In use, the excavator operator may collect real time data of the location of a feature. To collect real time data the excavator operator orients the dipper in the direction of the feature to be measured and illuminates the feature with the laser. To enhance daylight visibility to the operator of the laser illumination the signal may be enhanced by a second light color such as white or green light. Further enhancement of visibility may optionally be provided by a pattern of a second light color such as cross-hair.

In an alternative embodiment, the laser rangefinder may be mounted in alternative position to the dipper of the excavator. A suitable position would be on the cab of the excavator adjacent to the operator's station, but the embodiment is not so limited. Preferably the mounting would provide gimbal movement which would permit sighting the laser rangefinder to the illumination target. When coupled with a rotary encoder, the rangefinder may be directed to a target and illuminate the same independent of movement of the excavator arm, or the segments thereof. Appropriate set-offs from the location of the range finder and algorithms therefore would be programmed in the on board computer as in the embodiment with the rangefinder situated on the excavator arm. Data related to the sighting direction of the laser with respect to the location point of the excavator would be provided to the on board computer by rotary encoders on the gimbal which gimbal mount is rigidly connection to the excavator mainframe. axes.

Suitable laser rangefinders then transmit the distance from the range finder to the illuminated object to a programmed computer. In embodiments having the laser rangefinder mounted on the excavator arm 23 such as on the dipper segment 18. The length of the segment of the dipper 18 from the axis 24 to the laser rangefinder 10 is then arithmetically extended to the illuminated point. The three-dimensional location of the illuminated point is calculated by applying the resultant offset from the virtual dipper endpoint to the swing axis and subsequently to the location point of the excavator by arithmetic translation and rotation along the linkage using measurements from the aforementioned linear and rotary encoders. When the orientation of the excavator deviates from horizontal, then appropriate adjustments of the location for pitch and roll made to the data for determination of the three-dimensional location.

Data communication between the rangefinder and the computer may be hardwired, or by means of a personal area network communication such as "Bluetooth". Upon receipt of input data from the laser rangefinder the computer collects signals from the rotary encoders, the linear encoder if so equipped, and the job-site positioning reference station. Preferably the on board data collection computer is an appropriately programmed general purpose computer, perhaps a 'laptop' model.

The computer may calculate the coordinates of the feature by means of the algorithms programmed for the offsets, the rangefinder data and the job-site positioning data. Or optionally, the raw data may be downloaded for subsequent calculation of the feature location and preparation of as-built drawings, or transmitted to another computer removed from the excavator, possibly by recorded media, such as a memory chip, magnetic disk, or wireless means such as a cellular telephone modem for manipulation.

Figure 4:
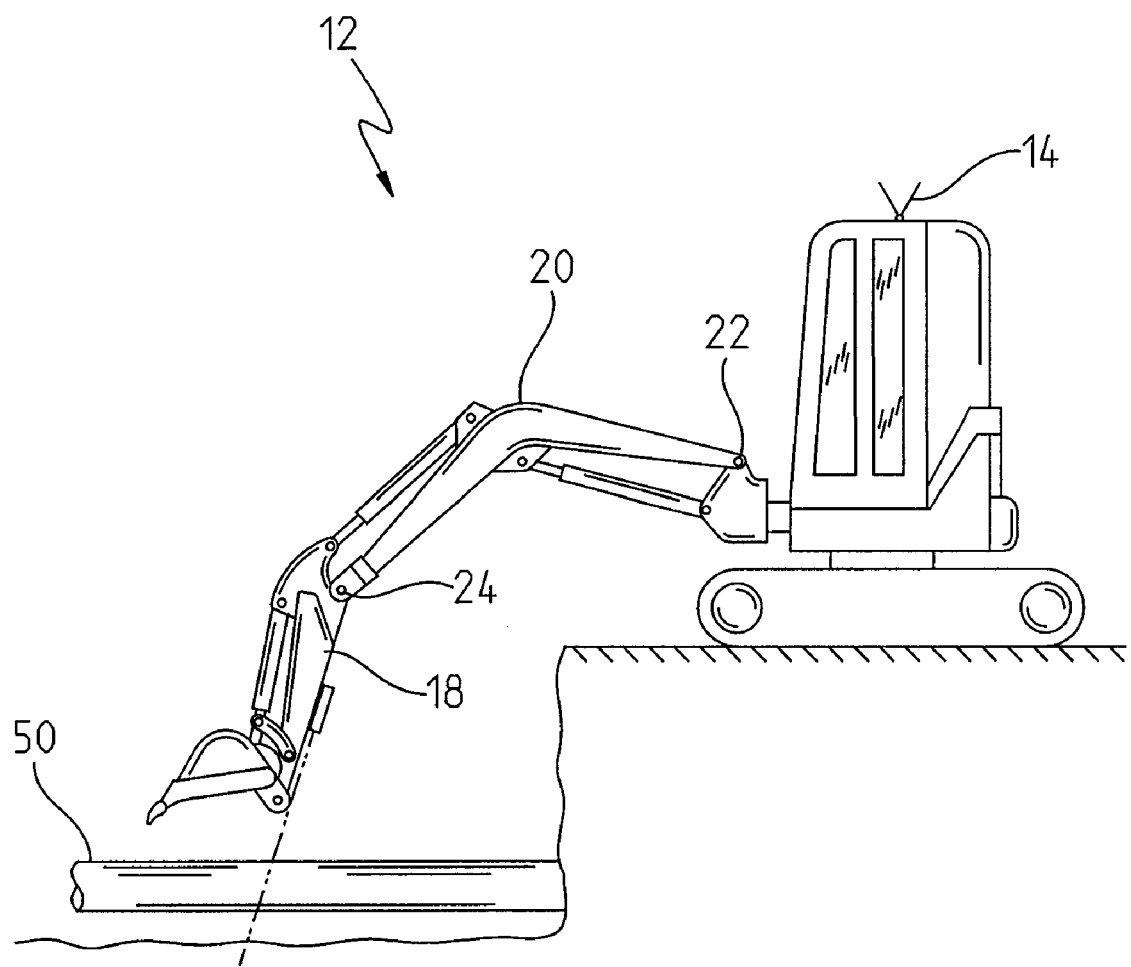
FIG. 4 illustrates sub surface location of an obstruction.

FIG. 4 shows a located sub-surface feature in an excavation. The computer may then provide the operator the opportunity to identify the feature by appropriate description or notation, for example: "buried electrical cable", or "ten inch water main" 50. The as-built drawing may be edited by the operator on board the excavator by modifying the engineering design drawing using a computer and display monitor provided.

Figure 1:
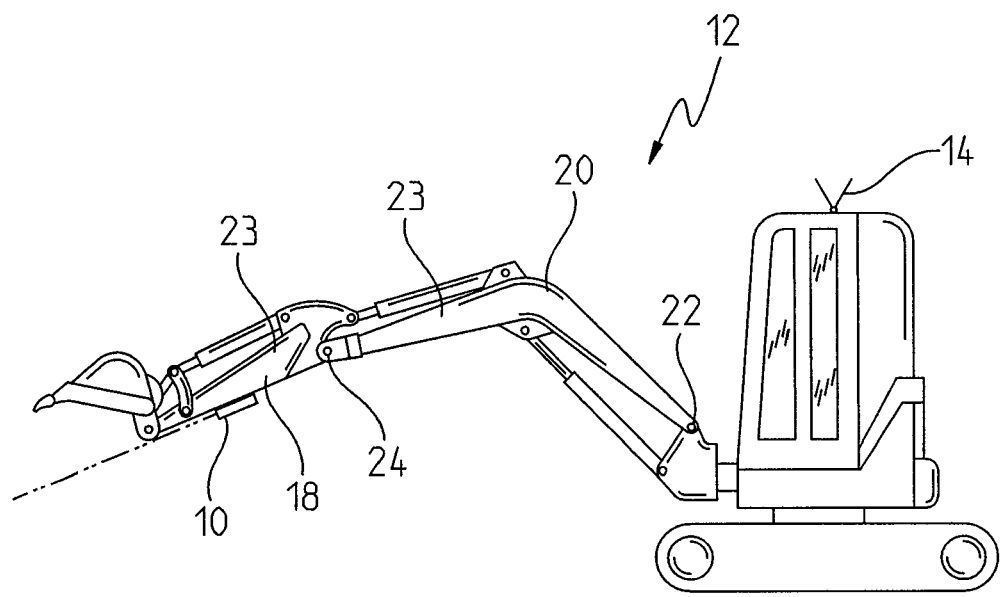
FIG. 1 illustrates an excavator equipped with a laser rangefinder.
Figure 2:
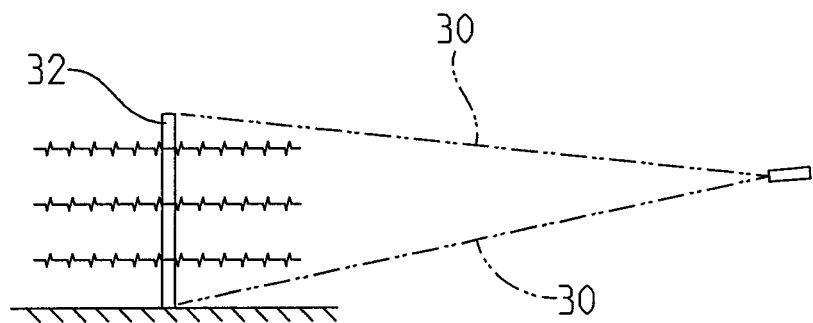
FIG. 2 illustrates location of an above ground feature with a laser rangefinder: a fence post.
Figure 3:
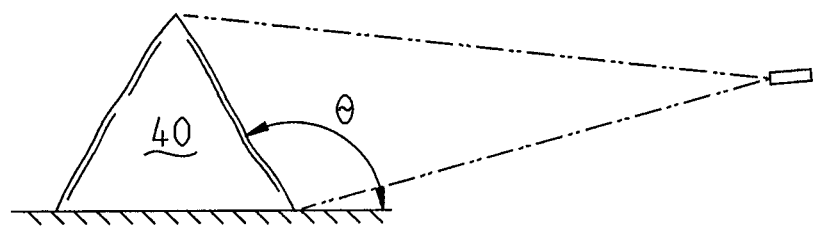
FIG. 3 illustrates location of a pile of manufactured material for volume measurement.

The utility of the on board measurement is not limited to the location of sub-surface conditions as heretofore described. As illustrated in FIG. 2, and FIG. 3, above ground structures may also be measured by illumination of the structure, such as the top and bottom of a fence post 30. The operator illuminates 30 the top and bottom the fence post 32 and initiates data collection by the on board computer for each illumination. Advantageously, the operator also inputs a notation associated with data collected by the on board computer from the illumination that identifies the data as that of a particular fence post. The notation input may be by voice collected by the computer by an appropriate microphone, or the notation may be made by traditional key board and mouse user interface, or both. The collected data upon manipulation by a computer suitably programmed generates the location and height of a fence post 32. The fence post may then be incorporated as a feature and appropriately located, with its associated height, on as-built drawings. If the on board computer is programmed to generate as built drawings in addition to collecting data therefore, the operator is then afforded the opportunity to see from the computer screen that the feature registers appropriately on the drawings.

A further useful feature of the disclosed and claimed invention is illustrated by FIG. 3. When combined with the common formula for the volume of a right circular cone: $V=(\pi r^2 h)/3$, the altitude of a processed construction material is readily determined, as is the radius either from the angle $\theta$ of intersection of the cone with a horizontal surface, or the difference of horizontal vectors of the laser illuminated measurements. The excavator operator then may conveniently measure the volume of a cone shaped stockpile 40 such as mined gravel, or coal or grain. The convenience of such a useful feature would enable the operator to collect data to determine a volume of material. It would therefore not be necessary for a separate survey of the stockpile to determine its volume.

The volume of the stockpile thus determined may be recorded in the computer, or recorded and transmitted to a central location via modem, where an appropriate charge for the stockpile may be made to a customer by a central billing office. With the benefit of transmitted data, immediate and accurate data of a volume of a stockpile delivered, appropriate invoicing of a customer, and cash flow of the vendor may be accelerated. Alternatively, the computer may be programmed to manipulate the data collected in a useful form and display the results to the operator. The resulting stockpile volume information could be reported to a customer on site.

To summarize, the system described and claimed may provide the X, Y, and Z axis location and dimension of several characteristics of topographic features such as: the dimensions of an excavation; the volume of a feature; the location and height of an above ground feature; the slope of a surface; the location of a sub-surface utility; the location of a sub-surface obstruction all from the operator position of an excavator.

As illustrated by a simplified example of a right circular cone, other measurements of angles, slopes, grades and volumes are readily accomplished from the operator seat of the excavator.

As disclosed heretofore, and claimed below, from the combination of the setoff of the excavator location point from the Local Positioning Station, the setoff of the laser rangefinder from the location point, and the setoff of the point illuminated by the laser rangefinder from the laser rangefinder, the location of the illuminated point may be determined with respect to the Local Positioning Station, thereby determining characteristics of topographical features e.g., features on, above, or below the surface of the earth, from the operator's position of an excavator. As the Local Positioning Station may be discontinued, and its original location become lost, by incorporating GPS data, the location of the feature may be stated and recorded with respect to the earth itself.

The complete record of the identity of the feature and precise measurements of the location of the feature are thereby recorded. The complete record may be integrated by the operator into design drawings by confirming or correcting the location of features in the as-built drawings. Complete records of as-built drawings may be downloaded from the computer for consolidation with other as-built drawings, or if real time corrections are required, the complete record as recorded may be transmitted to a location for receiving as-built information by means of cellular telephone modem or similar wireless means.

The utility and benefits described herein as well as modifications and adaptations by those skilled in the art may adapt the invention to specific uses without departing from the spirit and scope of the invention as claimed.

The invention claimed is:

1. A system for location of a topographic feature at a job-site comprising:
   a job-site positioning system for locating an excavator at the job-site;
   a feature locating system mounted on the excavator for locating the topographic feature at the job-site relative to the excavator;
   a computer programmed to receive input data from the job-site positioning system and the feature locating system, the computer evaluating the input data and a relationship between the job-site positioning system and the feature locating system to determine the location of the topographic feature at the job-site.

2. The system according to claim 1 wherein the computer is programmed to receive data representing at least one of pitch and roll of the excavator.

3. The system of claim 1 wherein the job-site positioning system includes a job-site reference location having a predetermined location, the computer being programmed to determine an offset from the job-site reference location.

4. The system according to claim 1 wherein the computer is programmed to receive notations from an operator concerning the topographic feature.

5. The system according to claim 1 wherein the computer transmits an output to another computer.

6. The system according to claim 5 wherein the other computer prepares as-built drawings.

7. The system according to claim 6 wherein the other computer records the location of the topographic feature at the job-site on at least one of the as-built drawings.

8. The system of claim 1 wherein the computer is a suitably programmed general purpose computer.

9. The system according to claim 8 wherein the general purpose computer manipulates data related to the topographic feature, generates an output, and displays the output on a display screen.

10. The system of claim 1 wherein the feature locating system includes a laser rangefinder configured to illuminate the topographic feature at the job-site and measure a distance between the laser rangefinder and the topographic feature.

11. The system according to claim 10 wherein the excavator includes a tool for moving material and an arm that is movably coupled to the excavator for moving the tool relative to the excavator, and wherein the laser rangefinder is mounted on the arm.

12. The system according to claim 10 wherein the laser rangefinder is configured to enhance visibility of the topographic feature illuminated by the laser rangefinder by directing at least one of a patterned light and a colored light onto the topographic feature.

13. The system according to claim 10 wherein the laser rangefinder is gimbally mounted to the excavator with a gimbal mount that is rigidly connected to the excavator.

14. The system of claim 1 wherein the excavator includes a tool for moving material and an arm that is movably coupled to the excavator for moving the tool relative to the excavator, and wherein the feature locating system is configured to detect movement of the arm relative to the excavator.

15. The system of claim 14 wherein the feature locating system includes at least one of a rotary encoder and a linear encoder to detect movement of the arm relative to the excavator.

16. The system of claim 1 wherein the job-site positioning system includes an antenna mounted to the excavator, the location of the antenna corresponding to the location of the excavator at the job-site.

17. A method for determining a characteristic of a topographic feature at a job-site comprising the steps of:
collecting data on a computer located on an excavator to determine a first offset between an excavator location point and a reference station;
collecting data on the computer to determine a second offset between the topographic feature and the excavator location point; and
manipulating the collected data to determine a characteristic of the topographic feature at the job-site.

18. The method of claim 17 wherein the collected data is transmitted to a computer apart from the excavator where it is manipulated to determine the characteristic of the topographic feature.

19. The method of claim 18 wherein the collected data is manipulated by the computer apart from the excavator to prepare as-built drawings.

20. The method of claim 18 wherein the collected data is transferred to the computer apart from the excavator by a means consisting of recorded media or wireless communication.

21. The method of claim 17 wherein the collected data is manipulated to determine the characteristic of the topographic feature by the computer on the excavator.

22. The method of claim 17, wherein the computer on the excavator is a suitably programmed general purpose computer.

23. The method of claim 17 further comprising the step of collecting data related to at least one of pitch and roll of the excavator.

24. The method of claim 17 wherein the characteristic of the topographic feature is one of a height, a length, a volume, and a slope of the topographic feature.

25. The method of claim 17 wherein the excavator includes a laser rangefinder, and wherein determining the second offset comprises combining a first offset portion between the topographic feature and the laser rangefinder with a second offset portion between the laser rangefinder and the excavator location point.

26. The method of claim 25, further comprising the step of enhancing illumination of the feature by directing at least one of a patterned light and a colored light from the laser rangefinder onto the feature.

27. The method of claim 25, wherein the excavator includes a tool for moving material and an arm that is movably coupled to the excavator for moving the tool relative to the excavator, and wherein the laser rangefinder is located on the arm.

28. The method of claim 25, wherein the laser rangefinder is gimbally mounted to the excavator with a gimbal mount that is rigidly connected to the excavator.

29. The method of claim 17 wherein the data collected to determine the first offset between the excavator location point and the reference station includes at least one of a laser frequency communication, a radio frequency communication, and a satellite signal.

30. The method of claim 17 wherein the reference station is positioned at a known location away from the job-site.

31. The method of claim 17 wherein the reference station is positioned at a known location on the job-site.

32. A method for determining a geographic location of an object at a job-site comprising the steps of:
providing a construction vehicle having a tool moveably coupled to the construction vehicle for moving material and an object locating system coupled to the construction vehicle;
determining a vehicle location point corresponding to a geographic location of the construction vehicle at the job-site;
determining a first offset between the vehicle location point and the object locating system;
determining a second offset between the object locating system and the object; and
determining an object location point corresponding to a geographic location of the object at the job-site, the object location point being separated from the vehicle location point by the first offset and the second offset.

33. The method of claim 32 wherein the vehicle location point corresponds to an antenna mounted to the construction vehicle.

34. The method of claim 32 further comprising the step of determining a third offset between the vehicle location point and a reference station having a predetermined geographic location.

35. The method of claim 32 further comprising the step of recording the object location point onto an as-built drawing.

36. The method of claim 32, wherein the object locating system includes a laser rangefinder that determines the second offset by illuminating the object at the job-site.

* * * * *